(12) United States Patent
Jang et al.

(10) Patent No.: US 8,070,981 B2
(45) Date of Patent: Dec. 6, 2011

(54) METHOD OF FABRICATING SILICA-TITANIA NANOPOROUS COMPOSITE POWDER

(75) Inventors: Hee Dong Jang, Daejeon (KR); Han Kwon Chang, Daejoen (KR)

(73) Assignee: Korea Institute of Geoscience and Mineral Resources, Daejoen (KR)

( * ) Notice: Subject to any disclaimer, the term of this patent is extended or adjusted under 35 U.S.C. 154(b) by 344 days.

(21) Appl. No.: 12/270,370

(22) Filed: Nov. 13, 2008

(65) Prior Publication Data
US 2010/0038586 A1    Feb. 18, 2010

(30) Foreign Application Priority Data

Aug. 16, 2008    (KR) ........................ 10-2008-0080217

(51) Int. Cl.
*C09K 3/00* (2006.01)
*H01B 1/02* (2006.01)
*B22F 1/00* (2006.01)
*C08K 3/02* (2006.01)
*C08K 5/00* (2006.01)

(52) U.S. Cl. ............. 252/182.32; 252/520.2; 252/521.3; 524/1; 524/80; 524/81; 523/524

(58) Field of Classification Search ............. 252/182.32, 252/520.2, 521.3; 424/426; 436/524, 525; 430/105; 428/32.17, 209; 977/773; 524/80, 524/81, 1; 523/524
See application file for complete search history.

(56) References Cited

U.S. PATENT DOCUMENTS
2009/0000651 A1 * 1/2009 Qiao ............................ 136/205

FOREIGN PATENT DOCUMENTS
WO    WO 2009/016143 A1    2/2009
WO    WO 2009/032988 A1    3/2009

OTHER PUBLICATIONS
Gi-Ra Ti, Ordered Macroporous Particles by Colloidal Templating May 24, 2004, Chem. Mater. 2001, 13, 2613-2618.*

* cited by examiner

*Primary Examiner* — Ling Choi
*Assistant Examiner* — Monique Peets
(74) *Attorney, Agent, or Firm* — Jenkins, Wilson, Taylor & Hunt, P.A.

(57) ABSTRACT

Provided is a method of fabricating silica-titania nanoporous composite powder by controlling a pore size. In more particular, a method of fabricating silica-titania nanoporous composite powder, using a spraying and heating reactor including an ultrasonic droplet generator and a cylindrical electric furnace, comprises the steps of: generating droplets of a mixture suspension from a colloidal suspension prepared by mixing silica ($SiO_2$) and titania ($TiO_2$) nanopowders and organic template (PSL: polystyrene latex) powder, by the ultrasonic droplet generator of the spray-heating reactor; generating a silica-titania-organic template nanoporous composite powder having pores within the range of 20~100 nm in size through preparing silica-titania-organic template ($SiO_2$—$TiO_2$-PLS) composite particles and removing the organic template while passing the mixture suspension in the cylindrical electric furnace by a carrier gas; and collecting the generated nanoporous material by a particle collector.

5 Claims, 4 Drawing Sheets

METHOD OF FABRICATING SILICA-TITANIA NANOPOROUS COMPOSITE POWDER

CROSS-REFERENCE TO RELATED APPLICATION

This application claims the benefit of Korean Patent Application No. 2008-80217, filed Aug. 16, 2008, the disclosure of which is hereby incorporated herein by reference in its entirety.

BACKGROUND OF THE INVENTION

1. Technical Field

The present invention relates to a method of fabricating silica-titania nanoporous composite powder and, more particularly, to a method of fabricating silica-titania nanoporous composite powder by spraying and heating method which is capable of preparing spherical-shaped silica-titania nanoporous composite powder by drying liquid droplets sprayed from a silica-titania-organic template mixture suspension by an ultrasonic droplet generator and heating the powder to remove the organic template in the dried composite powder.

2. Discussion of Related Art

A nanoporous material refers to powder having pores which are 100 nm or less in size. Since nanoporous materials are capable of impregnating catalyst materials in various nano sizes within the pores, they are used as the advanced nanomaterials for catalyst impregnation.

Much research of nanoporous materials has been conducted due to the variety of their potential application fields, such as catalysts, separators, coating agents, chromatography, low-dielectric constant fillers, paints, microelectro-devices and electro-optics, and the like.

As the prior art relating to the technology for fabricating nanoporous material powder, there are published U.S. Pat. No. 6,696,258 B1 (entitled: Mesoporous materials and methods of making the same; Filing Date: Jun. 21, 2000), Korean Patent No. 10-0385338 (entitled: Mesoporous silica, methods of compounding the same, and uses thereof; Filing Date: May 20, 2000) and Korean Patent No. 10-0549163 (entitled: Method of preparing silica-titania composite materials having nanoporous structure for impregnating biocatalyst; Filing Date: Oct. 20, 2001), and others.

However, in the aforementioned U.S. Pat. No. 6,696,258, Korean Patent Nos. 10-0385338 and 10-0549163, since nanoporous materials are fabricated by liquid phase method, there is a drawback in that it takes long time to prepare the nanoporous materials. Moreover, since the distribution of pore sizes of the prepared nanoporous materials is 10 nm or less, the application thereof is very restrictive and it is difficult to control the pore sizes.

SUMMARY OF THE INVENTION

Therefore, the present invention is directed to provide a method of fabricating silica-titania nanoporous composite powder through spraying and heating method by which liquid droplets sprayed from a colloidal suspension mixture including silica nanopowder, titania nanopowder and organic template nanopowder are dried and the template is removed by an electric furnace, to fabricate spherical silica-titania nanoporous composite powder having nanopores within the range of 20~100 nm in size.

Another object of the present invention is to provide a method of controlling the pore size of the nanoporous composite powder and a composition of the composite powder.

Exemplary embodiments of the present invention provide methods of fabricating silica-titania nanoporous composite powder.

In accordance with an exemplary embodiment, the present invention provides a method of fabricating silica-titania nanoporous composite powder, comprising preparing a silica-titania suspension by adding silica-titania nanopowder consisting of 50~99 wt % silica nanopowder and 1~50 wt % titania nanopowder to water, or preparing a silica-titania-organic template mixture suspension by adding nanopowder consisting of silica-titania nanopower and organic template nanopowder to water, wherein the silica-titania nanopowder consists of 50~99 wt % silica nanopowder and 1~50 wt % titania nanopowder.

That is, the mixture suspension is the silica-titania suspension or silica-titania-organic template suspension including 50~100 wt % silica-titania nanopowder and 0~50 wt % organic template nanopowder.

The concentration of the nanopowder mixture in the mixture suspension is 1~10 wt %. That is, the mixture suspension consists of 1~10 wt % silica-titania nanopowder and 90~99 wt % water or 1~10 wt % silica-titania-organic template nanopowder and 90~99 wt % water.

The silica-titania nanoporous composite powder is obtained by spraying the silica-titania mixture suspension or silica-titania-organic template mixture suspension in a fine droplet by an ultrasonic atomization, drying the mixture suspension sprayed in the droplet in a drying furnace at a low temperature region of 100~400° C. to remove the water only in the composite powder, and heating the dried composite powder at a high temperature region of 600~800° C. to remove the organic template nanopowder.

The organic template nanopowder uses polystyrene latex (PSL).

The polystyrene latex (PSL) used as the organic template nanopowder is not thermally discomposed at the low temperature region of 100~400° C. in the drying furnace and is thermally discomposed at the high temperature region of 600~800° C.

The particle size of the organic template nanopowder is 60~200 nm.

The pore size of the prepared silica-titania nanoporous composite powder is controlled according to the particle size of the organic template nanopowder.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided as teaching examples of the invention.

In fabricating silica-titania nanoporous composite powder according to the present invention, a successive process technology including preparation, spraying, drying of mixture suspension and removal of organic template powder will be described, in detail, with reference to the drawings accompanying analysis results.

Figure 1:
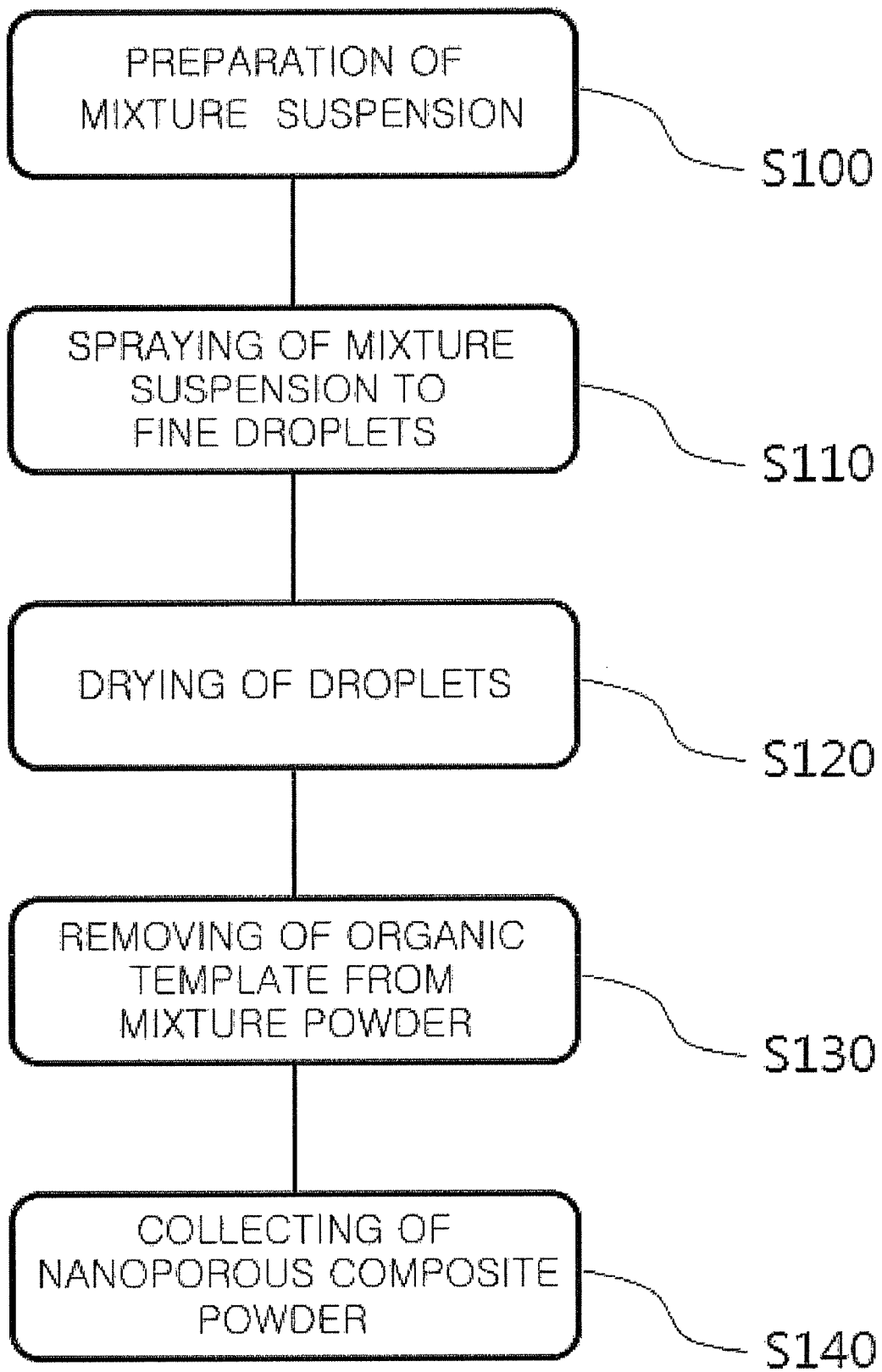
FIG. 1 is a flow chart for explaining a process for fabricating silica-titania nanoporous composite powder according to the present invention.

FIG. 1 is a flow chart of a process for fabricating silica-titania nanoporous composite powder according to the present invention.

FIG. 1 illustrates the continuity of the process comprising: preparing a silica-titania-organic template mixture suspension as a starting material; spraying fine liquid droplets from the mixture suspension by an ultrasonic atomization; drying and heating the sprayed droplets to remove the water and the organic template by an electric furnace; and collecting nanoporous composite powder by a filter.

Below, the present invention will be specifically described.

The method of fabricating silica-titania nanoporous composite powder comprises: a step S100 of preparing a silica-titania-organic template mixture suspension through preparing a silica-titania powder suspension by adding silica nanopowder and titania nanopowder to water, and mixing the silica-titania powder suspension and an organic template nanopowder suspension; a step S110 of spraying the suspension in a fine droplet by an ultrasonic atomization; a step S120 of preparing silica-titania-organic template powder mixture including the organic template by transferring the droplet of the mixture suspension to a low temperature region of a cylindrical electric furnace so as to be dried, using a carrier gas (air or oxygen); a step S130 of removing the organic template from the powder mixture to fabricate the silica-titania nanoporous composite powder having nanometer size pores, by transferring the powder mixture including the organic template dried in the step S120 to a high temperature region of the electric furnace so as to remove the organic template powder; and a step S140 of collecting the nanoporous composite powder generated in the step S130, by a particle collector including a filter.

The step S100 of preparing the silica-titania-organic template mixture suspension includes; preparing the silica-titania nanopowder mixture suspension by adding 50~99 wt % silica nanopowder and 1~50 wt % titania nanopowder to water and stirring the mixture suspension by using a mixer; and forming the silica-titania-organic template mixture nanopowder suspension by mixing the silica-titania nanopowder suspension and the organic template nanopowder suspension in order that the weight percentages of silica titania nanopowder and the organic template nanopowder are 50~100 wt % and 0~50 wt %, respectively, wherein the total mixture solid silica-titania-organic template nanopowder in the mixture suspension is 1~10 wt %.

The composition of titania in the silica-titania nanoporous powder is controlled by manipulating the mixing ratio of the titania nanopowder in the suspension.

As the organic template nanopowder, polystyrene latex of 60~200 nm in size is used, thereby controlling the pore size of the fabricated nanoporous powder.

The step S110 of spraying the mixture suspension generates the fine droplets of the silica-titania-organic template suspension by atomizing the mixture suspension prepared in the step S100 of preparing the silica-titania-organic template suspension using the ultrasonic atomization.

The step S120 of drying the droplets of the mixture suspension prepares the composite powder consisted of silica-titania-organic template to have pores 50 nm or less in size, by transferring the droplets to the low temperature region of the cylindrical electric furnace which is below 400° C. by the air which is the carrier gas injected at the flow rate of 0.1~5.0 l/min, drying the droplets of the silica-titania-organic template mixture suspension prepared in the step S110.

The low temperature region of the electric furnace is generally 100~400° C.

The step S130 of removing the organic template generates the pores of size 50 nm or more, by transferring the mixture powder consisted of silica-titania-organic template prepared in step S120 to the high temperature region of the cylindrical electric furnace which is above 600° C., and thermally discomposing only the organic template to be selectively removed.

That is, when the composite powder consisted of silica-titania-organic template is introduced into the high temperature zone, only the organic template is thermally decomposed to be selectively removed, thereby forming the pores.

When the pores are formed by removing the organic template as described above, the sizes of the pores are controlled depending on the size of the organic template.

The high temperature region of the electric furnace is generally 600~800° C.

The various exemplary embodiments of the present invention will be described below:

Exemplary Embodiment 1

In the first exemplary embodiment, in the step S100 of preparing the silica-titania-organic template mixture suspension, the size of polystyrene latex (PSL) particle used as the organic template is varied within the range of 60~200 nm, thereby controlling the pore size of the silica-titania nanoporous composite powder.

In the step S100 of preparing the mixture suspension as illustrated in FIG. 1, the mixture suspension is prepared to include powder mixture at the ratio of 65 wt % silica nanopowder: 10 wt % titania nanopowder: 25 wt % PSL nanopowder, wherein the concentration of the total solid nanopowder in the mixture suspension is 5 wt %.

The particle size of the PSL nanopowder is controlled to be within the range of 60~200 nm.

In the step S110 of spraying the fine droplets of the mixture suspension, the step S120 of drying the sprayed droplets and the step S130 of removing the organic template from the powder mixture, the silica-titania nanoporous composite material is fabricated through generating the fine droplets of the mixture suspension by the ultrasonic atomization, drying the fine droplets of the mixture suspension at a temperature of 400° C. or below in the cylindrical electric furnace, and removing the PSL particles at a temperature of 600° C. or above while flowing the air as the carrier gas at the flow rate of 1 l/min.

Figure 2:
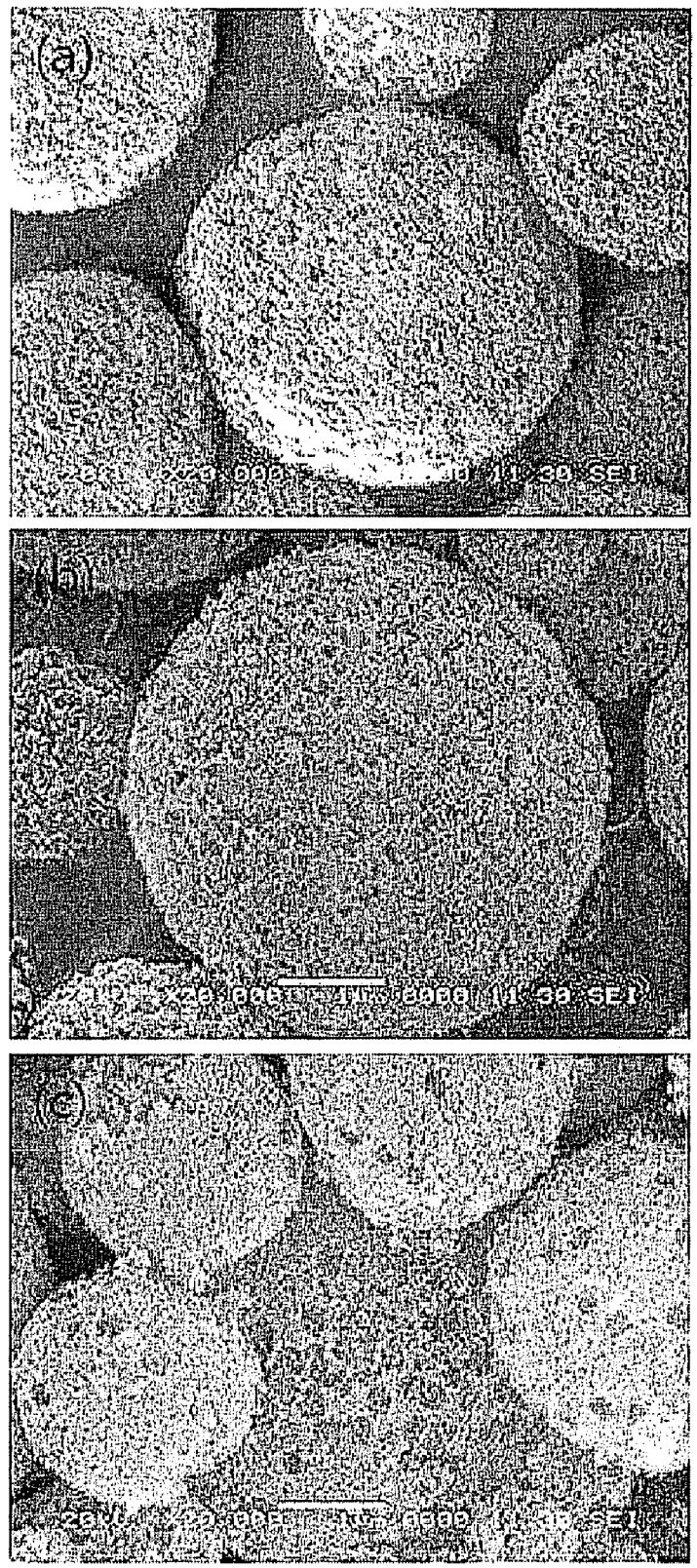
FIG. 2 is a picture taken by an electron microscope, showing the silica-titania nanoporous composite powder generated according to a change in the particle size of organic template powder.

FIG. 2 shows a SEM (scanning electron microscopy) picture of the silica-titania nanoporous composite powder fabricated by varying the PSL particle size of the organic template powder to (a) 60 nm, (b) 100 nm and (c) 200 nm. As a result, it is known that the pore size is controlled by varying the PSL particle size.

Figure 3:
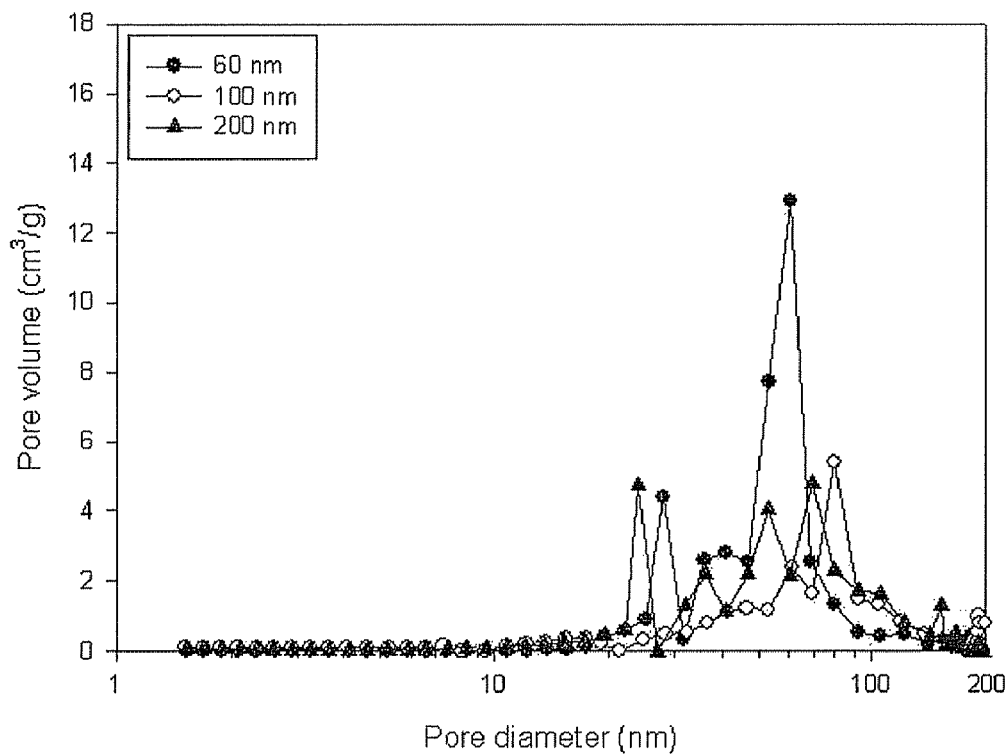
FIG. 3 is a distribution chart of the pore size of the silica-titania nanoporous composite powder generated according to the change in the particle size of the organic template powder.

FIG. 3 shows the pore size distribution of the silica-titania nanoporous composite powder fabricated by controlling the pore size, using the BJH (Barrett-Joyner-Halenda) method. The nanoporous composite powder fabricated according to the present invention has the pores within the range of 20~100 nm in size and the pore size is controlled by varying the PSL particle size.

Further, as a result of the specific surface area of the fabricated nanoporous composite powder measured by the BET (Brunauer, Emmett, Teller) method, the specific surface area of the nanoporous powder prepared by using the PSL particle sizes of 60 nm, 100 nm and 200 nm are 151 $m^2/g$, 154 $m^2/g$ and 142 $m^2/g$, respectively.

Exemplary Embodiment 2

In the second exemplary embodiment, in the step S100 of preparing the mixture suspension, the silica-titania nanoporous composite powder having the pore size of 60 nm or less is fabricated by adding no organic template powder.

In this second embodiment, the silica-titania nanoporous powder is fabricated under same conditions as the first exemplary embodiment except using the silica nanopower mixed of 1 wt % titania nanopowder without mixing the PSL particles used as the organic template powder.

Figure 4:
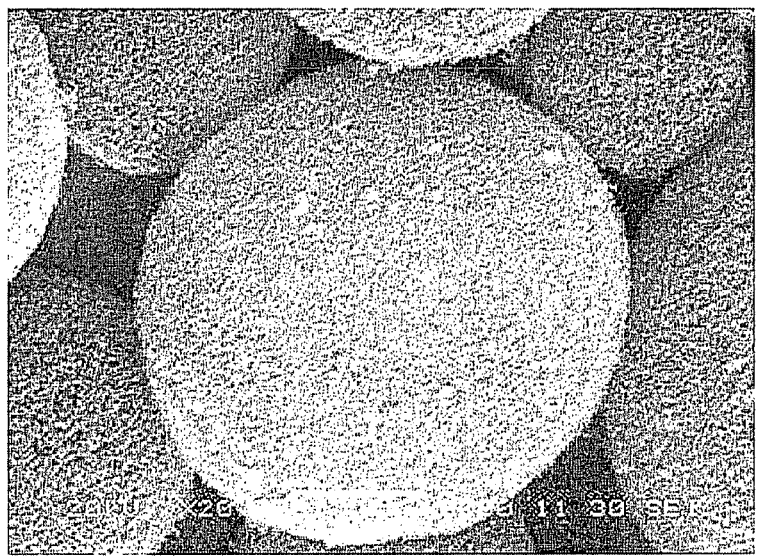
FIG. 4 is a picture taken by an electron microscope, showing the silica-titania nanoporous composite powder fabricated without adding organic template powder.

FIG. 4 shows a SEM picture of the silica-titania nanoporous composite powder fabricated by adding no PSL particles of the organic template powder. The porous powder has spherical-shape particles and there is no pore equal or larger than 60 nm corresponding to the PSL particle size.

Exemplary Embodiment 3

In the third exemplary embodiment, in the step S100 of preparing the mixture suspension, the composition of the silica-titania nanoporous composite powder is controlled by controlling the mixing ratio of the titania nanopowder in the mixture suspension.

In this third embodiment, the silica-titania nanoporous powder is fabricated under same conditions as the second exemplary embodiment except using the titania nanopowder of varied mixing ratio between 1~20 wt % in the silica nanopowder.

Figure 5:
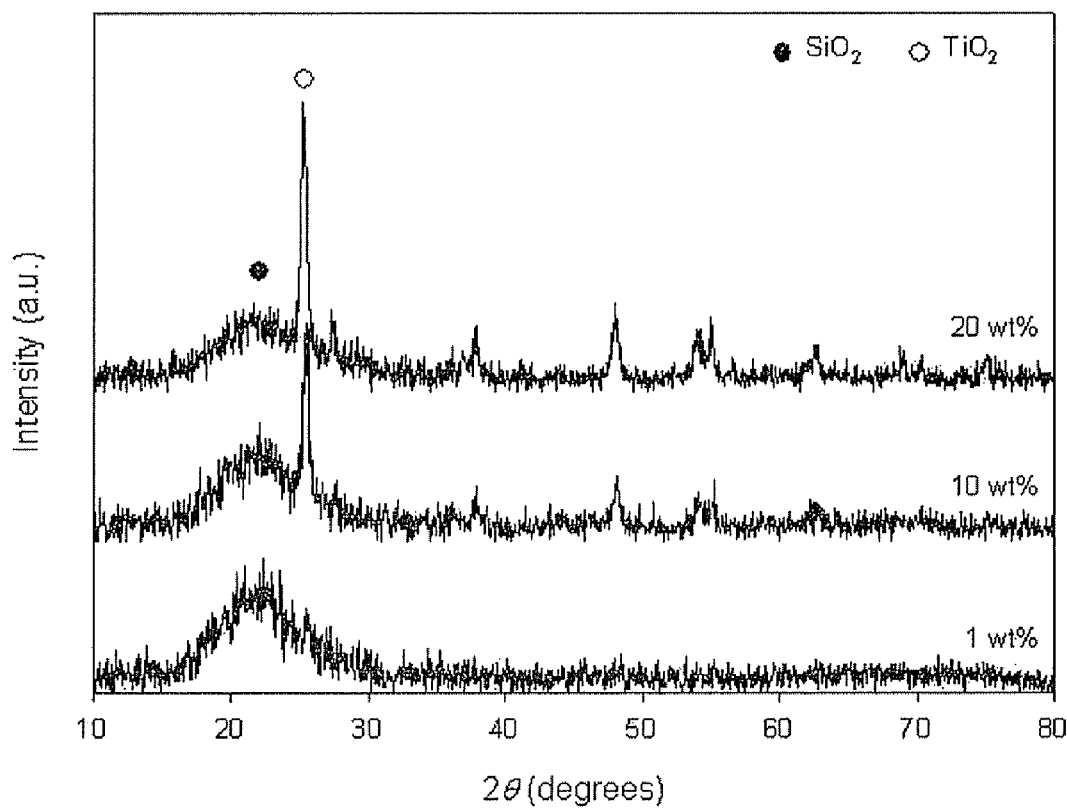
FIG. 5 is an X-ray diffraction analysis diagram of the silica-titania nanoporous composite powder generated by controlling the mixing ratio of titania nanopowder.

FIG. 5 shows a diffraction pattern of the silica-titania nanoporous composite powder, which is fabricated by controlling the mixing ratio of the titania nanopower, using the X-ray diffraction (XRD) analysis. As the weight mixing ratio of the titania nanopower changes to 1%, 10% and 20%, an increase of the titania intensity peaks shows a change in the composition of the silica-titania nanoporous composite powder.

In accordance with the method of fabricating the silica-titania nanoporous composite powder, the pore size and the composition of titania in the silica-titania nanoporous composite powder are controlled by manipulating the particle size of the organic template nanopowder and the mixing ratio of titania nanopowder to silica nanopowder.

Furthermore, in accordance with the method of fabricating the silica-titania nanoporous composite powder, the mixture suspension sprayed into the fine droplets by the ultrasonic spray is dried, and a fabrication time is shortened.

The invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A method of fabricating silica-titania nanoporous composite powder, comprising:
   preparing a silica-titania-organic template mixture suspension comprising 1-10 wt % of a silica-titania-organic template nanopowder mixture by mixing a silica-titania nanopowder mixture consisting of 50-99 wt % silica nanopowder and 1-50 wt % titania nanopowder with an organic template nanopowder in a suspension;
   spraying the silica-titania-organic template mixture suspension to generate fine droplets by a droplet generator;
   drying the sprayed droplets of the silica-titania-organic template mixture suspension in a low temperature region of an electric furnace at 100-400° C. to provide a dried silica-titania-organic template mixture powder; and
   heating the dried silica-titania-organic template mixture powder in a high temperature region of the electric furnace at 600-800° C. to remove the organic template nanopowder.

2. The method according to claim 1, wherein the organic template nanopowder is polystyrene latex (PSL) of 60~200 nm in size.

3. The method according to claim 1, wherein the silica-titania-organic template nanopowder mixture consists of 50~99 wt % silica-titania nanopowder mixture mixed with 1~50 wt % organic template nanopowder.

4. The method according to claim 1, wherein the droplet generator is an ultrasonic atomization.

5. The method according to claim 1, wherein preparing the silica-titania-organic template mixture suspension comprises adding silica nanopowder and titania nanopowder to water to form a silica-titania nanopowder mixture suspension, and mixing the silica-titania nanopowder mixture suspension and an organic template nanopowder suspension.

* * * * *